April 26, 1960 R. L. LOGSDON 2,934,691
SYNCHRO-PHASER FOR ANALYZING SYSTEMS
Filed June 13, 1956
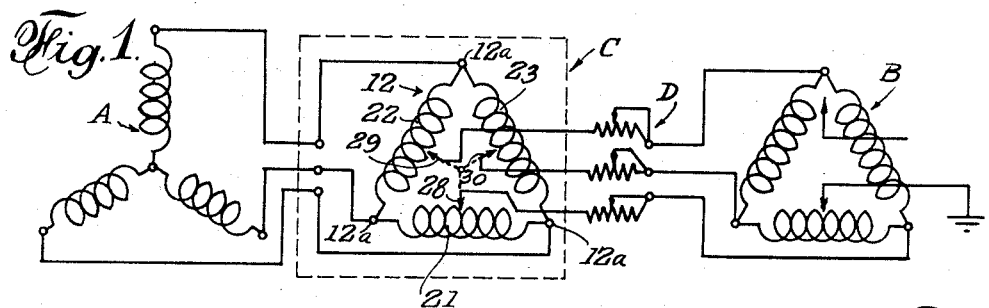
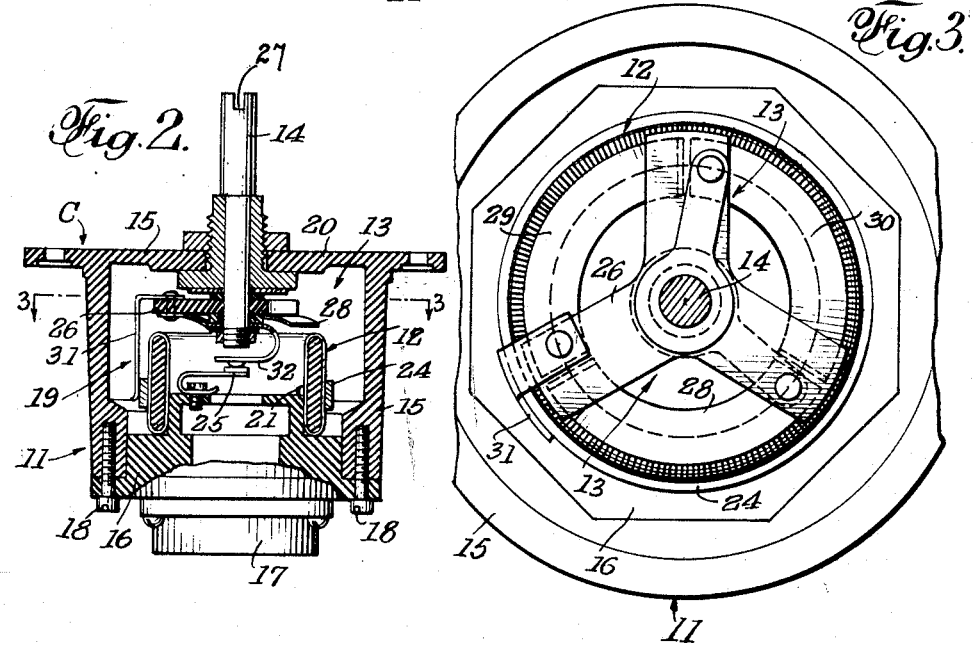
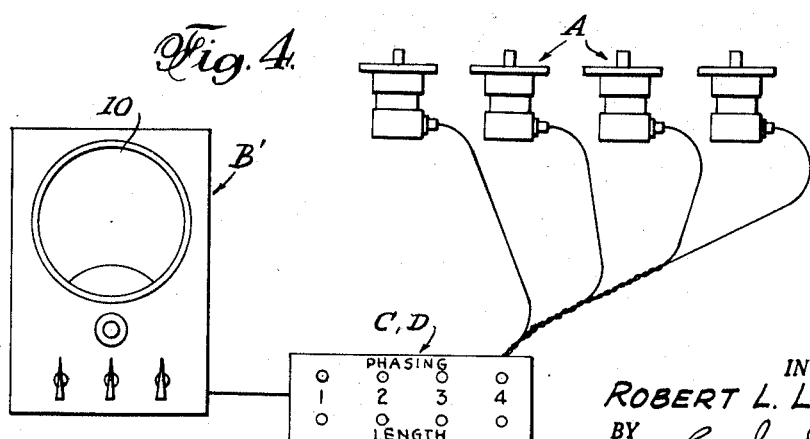
INVENTOR.
ROBERT L. LOGSDON
BY C. S. Stratton
ATTORNEY

United States Patent Office 2,934,691
Patented Apr. 26, 1960

2,934,691

SYNCHRO-PHASER FOR ANALYZING SYSTEMS

Robert L. Logsdon, Burbank, Calif.

Application June 13, 1956, Serial No. 591,079

11 Claims. (Cl. 321—57)

This invention relates to a synchro-phaser component adapted to be combined in engine analyzer systems that use cathode ray tubes. The invention deals with the synchro-phaser component or unit per se and also with an analyzer system embodying such a component.

At the present time, analyzers of aircraft engines are phased while on the ground and on a single-engine basis.

The cathode ray tube engine analyzer used for this purpose is a modified version of a laboratory oscilloscope that has been adapted to the aircraft engine for the purpose of providing analysis of the condition of the complete ignition system and cylinder mechanical function during actual engine operation. This is done through the display of spark plug voltage patterns and amplified voltage patterns transmitted from vibration pickup assemblies. These patterns are displayed in sequence on a horizontal plane across the center of the cathode ray tube face. The pattern display is created by a connection of ignition primary voltage and vibration voltage to the cathode ray tube vertical sweep circuit, through proper switching. Simultaneously, the horizontal sweep circuit of the CRT is excited by a three-phase, two-pole generator which is mounted on the aircraft engine and driven by the engine crankshaft and at ½ crank speed. Thus, the horizontal sweep is synchronized to engine crank speed and all consistent engine functions such as ignition, spark plug firing and cylinder valve events. In order that these events may be properly identified, a specific phase relation must be established between the three-phase synchronizer generator and the engine event. The actual process of establishing this relationship is generally referred to as "sync. generator timing" or "orientation." The sync. generators currently manufactured are provided with either a split housing or rotatable flange which will permit the necessary phase angle shift or generator timing. A means for locking the assembly in proper position is also provided. Some portable analyzers have a means for synchronizer timing built in the analyzer knob controls.

An object of the present invention is to provide novel and improved means to accomplish synchronizer generator timing of aircraft engines from the aircraft (usually, by the analyzer operator), thereby enabling considerable saving of time, material and cost, as well as eliminating error often induced by change between ground and air operation of engines.

Another object of the invention is to provide means for phasing the synchronizer generator to the ignition impulse or crank angle reference point of an engine.

Another object of the invention is to provide a synchro-phaser that is particularly adapted to be located within an aircraft convenient to the usual engine analyzer that is provided, a separate synchro-phaser being contemplated to be provided for the driven synchronizer generator of each engine of the aircraft, thereby precluding the need for current requirements for sync. generator timing and other timing provisions now built into the generator structures.

A further object of the invention is to provide the combination with (a) an analyzer system used as a converter of three-phase to single-phase energy, and (b) a three-phase A.C. synchronizer generator, of (c) a balanced phase-shifting device or unit that is interposed between means (a) and (b).

A still further object of the invention is to provide a balanced phase-shifting unit that constitutes a balanced impedance across the output of the synchronizer generator.

A yet further object of the invention is to embody variable resistance between the output of the unit (c) above and the unit (b) to balance the three-phase potential when more than one synchronizer generator and synchrophaser are used, as in a multi-engine aircraft.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes one embodiment of the present invention, which is given by way of illustration or example only.

In the drawing, like reference characters designate similar parts in the several views.

Fig. 1 is a diagrammatic view of a conventional engine analyzer of the cathode ray type and provided with a balanced phase-shifting unit according to the present invention.

Fig. 2 is a sectional view physically showing a unit, as above referred to.

Fig. 3 is an enlarged cross-sectional view as taken on line 3—3 of Fig. 2.

Fig. 4 is a schematic view of an analyzer system for a multiple engine installation.

The present system, as diagrammatically illustrated in Fig. 1, comprises, generally, a sync. generator A, the converter from three-phase to single-phase means B, and a balanced phase-shifting unit C connected between the devices A and B. In installations using more than one sync. generator and synchro-phaser, variable resistances or potentiometers D may be used to balance the different circuits involved. Such a multiple installation is shown in Fig. 4 in which B' is a generally conventional engine analyzer in which is embodied the phase converter B, A is the usual engine-driven sync. generators, and C, D synchro-phaser unit that embodies also sweep length adjustment, one for each engine.

The synchro-phaser C comprises a phase-shifting unit that is capable of being shifted through a full 360° and that all ignition or vibration events of the engine will have shifted across the indicator oscilloscope tube 10 in proportion to shaft rotation of the synchro-phaser. Thus, phasing is accomplished by the unit C, whereas prior phase shift required rotation of the sync. generator on its mount or some such comparable adjustment of the generator.

The unit C, as shown in Figs. 2 and 3, comprises, generally, a housing 11, a delta-connected winding 12 disposed centrally in said housing, a brush unit 13 centered on said winding, and a control shaft 14 connected to shift said brush unit to, thereby, shift the phase of the impedance of said winding.

The housing 11 is shown as comprising a main body 15 by means of which the unit C may be mounted in operative position, a closure member 16 for said body, and a conductor-passing fitting 17 carried by the member 16. The housing is held in assembly as by screw 18, to enclose the interior space 19. The mentioned winding 12 is carried by member 16 and is disposed in space 19, and the mentioned brush unit 13 and control shaft 14 are carried by the body 15, the former within space 19 and the latter passing through the mounting wall 20 of the body.

The winding 12 is carried by the housing member 16 and has a circular or sleeve-like form. By means of a set of taps 12a, said winding is divided into three resistance coils 21, 22 and 23 in delta arrangement (see Fig. 1). The end of winding 12 that is directed toward the brush unit 13 is bared, enabling said unit to make wiping electrical contact with the winding coils 21, 22 and 23. A slip ring 24 is carried by said winding, although not in electrical contact therewith. While the same is not shown, said ring 24 is provided with a conductor that passes through the member 16 and outward through fitting 17.

The member 16 is provided with a terminal 25 that has a central location and is resilient. A current conductor (not shown) is connected to said terminal.

The brush unit 13 comprises a dielectric three-armed spider 26 mounted on the shaft 14 to be rotatively adjustable upon adjustment of said shaft by means of a screw driver or the like applied in slot 27. Said spider mounts three brushes 28, 29 and 30 that have wiping contact with the bared portions of the winding 12, a brush 31 that has wiping contact with slip ring 24, and a central terminal 32 that is in contact with terminal 25.

The above are so arranged as to provide the electrical arrangement of Fig. 1 wherein the impulses of the three-phase current of unit A are brought to the taps 12a of the delta winding and the phase-shifted current on brushes 28, 29 and 30 are brought outward as will be apparent from the drawing, through the slip ring 24, the central terminal 25, and the shaft 14, respectively, for connection to the analyzer B or to said analyzer through potentiometers D.

Since adjustment of the shaft 14, by reason of the described brush design of unit C, may be made through a range of 360°, the desired balance may be readily effected. Also, such adjustment may be made right in the cockpit to give the advantages above referred to.

The arrangement for two, three, four or more engines is illustrated in Fig. 4, and the same employs the above circuitry, the potentiometers D serving to balance the different synchronous circuits.

The present invention having basis on the ordinary engine analyzer means can, with improved facility and accuracy, be operated to time the sync. generator, time the crankshaft, determine malfunction of timing, etc. However, instead of physically disturbing the positions of the sync. generator and, perhaps, other parts, all adjustment is made in the present phase-balance unit C.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described my invention, what I claim and desire to secure by Letters Patent is:

1. In an engine analyzing apparatus having an engine-driven synchronous generator producing three-phase energy and a converter of three-phase to single-phase energy, the improvement that comprises a balanced-phase shifting unit for three-phase alternating current connected between the generator and the converter and including a delta-connected winding as a balanced impedance between the generator and converter, said delta-connected winding having first and second sets of three terminals each, one set connected to the winding 120° apart, and the other set adjustably connected selectively to points 120° apart on the winding, the first set of terminals being connected to the generator and the second set being connected to the converter.

2. In apparatus according to claim 1, a set of brushes electrically engaged with said winding constituting the adjustable set of terminals and movable through a full 360° of adjustment.

3. In an engine analyzing apparatus having an engine-driven synchronous generator producing three-phase energy and a converter of three-phase to single-phase energy, the improvement that comprises a balanced-phase shifting unit for three-phase alternating current connected between the generator and the converter and including a delta-connected winding as a balanced impedance between the generator and converter, said delta-connected winding having first and second sets of three terminals each, one set connected to the winding 120° apart, and the other set adjustably connected selectively to points 120° apart on the winding, the first set of terminals being connected to the generator and the second set being connected to the converter and a set of three balancing potentiometers each connected between a different one of the second set of terminals of the delta winding and the converter.

4. In an engine analyzing apparatus having an engine-driven synchronous generator producing three-phase energy and a converter of three-phase to single-phase energy, the improvement that comprises a balanced-phase shifting unit for three-phase alternating current including a delta-connected winding as a balanced impedance between the generator and converter, said winding having three taps each connected to one phase of said three-phase generator and three brushes each connected to the converter.

5. In an engine analyzing apparatus having an engine-driven synchronous generator producing three-phase energy and a converter of three-phase to single-phase energy, the improvement that comprises a balanced-phase shifting unit for three-phase alternating current connected between the generator and the converter and including a delta-connected winding and a brush in wiping contact with each coil of said winding, said delta-connected winding having three coils and first and second sets of three terminals each, one set consisting of successive junction terminals of the coils, the other set consisting of terminals of said brushes, said phase shifting unit constituting a balanced impedance between the generator and the converter with the first set of terminals connected to the generator and a second set connected to the converter.

6. In apparatus according to claim 5, said brushes being mounted to move together.

7. In apparatus according to claim 5, said brushes being mounted to move together and through a 360° range of adjustment.

8. In an engine analyzing apparatus having an engine-driven synchronous generator producing three-phase energy and a converter of three-phase to single-phase energy, the improvement that comprises a balanced-phase shifting unit for three-phase alternating current connected between the generator and the converter and including a delta-connected winding and a brush in wiping contact with each coil of said winding, said phase shifting unit constituting a balanced impedance between the generator and the converter, and a set of three balancing potentiometers connected one between each brush and the converter.

9. In an engine analyzing apparatus having an engine-driven synchronous generator producing three-phase energy and a device having three-phase input terminals, the improvement that comprises a balanced-phase shifter unit for three-phase alternating current connected between the generator and the device and including continuous resistance wire with a set of three uniformly spaced terminals to form delta connections and three adjustable taps with means for advancing each of said taps the same amount along the resistance wire to form a balanced-phase shifter, a second set of terminals each connected to one of said taps, one set of terminals being connected to the synchronous generator, and the other set being connected to the terminals of the said device whereby a phase shift is accomplished resistively, free from inductance.

10. In an engine analyzing apparatus having an engine-driven polphase synchronous generator with a plurality of output terminals and a response device having a plurality of polyphase input terminals, a balanced-phase shifting unit provided with a set of polyphase terminals adapted to be connected to the synchronous generator and a set of polyphase terminals adapted to be connected to the response device, said phase shifting unit comprising an annular resistor provided with a plurality of points thereon, each connected to a terminal of one set of said polyphase phase shifter terminals, and a plurality of brushes each connected to one of the terminals of the other set of polyphase phase shifter terminals, a rotatable spider having an axis of rotation concentric with said annular resistor, means for adjusting the angular position of the spider, said brushes being in the form of wiper springs each mechanically connected to the spider at one end, but electrically insulated therefrom and making wiping contact with the annular resistor at the opposite end.

11. Apparatus as in claim 10 for a three-phase system in which each set of terminals consists of three terminals and there are three wiper brushes, an annular stationary contact is provided surrounding the annular resistor but insulated therefrom, and the spider is provided with a shaft and carries an additional wiper contact insulated from the brushes but making continuous contact with said annular stationary contact, a centrally mounted stationary contact is provided within the annular resistor, and the spider carries a resilient spring with a contact thereon abutting said centrally mounted stationary contact, one of said wiper brushes being connected to said annular ring wiping contact, another of said wiper brushes being connected to said resilient spring electrically, the set of output terminals of said phase shifter connected to the response device having one terminal connected to the annular contact, and a second terminal connected to the centrally mounted contact, whereby phase shifter connections are brought out.

References Cited in the file of this patent

UNITED STATES PATENTS

| | | |
|---|---|---|
| 1,753,322 | Tanner | Apr. 8, 1930 |
| 2,179,337 | Leukert | Nov. 7, 1939 |
| 2,469,188 | Werner | May 3, 1949 |
| 2,648,811 | Sohon et al. | Aug. 11, 1953 |
| 2,720,576 | Lackner | Oct. 11, 1955 |
| 2,778,988 | Pihl | Jan. 22, 1957 |